United States Patent
Canpolat et al.

(10) Patent No.: US 12,004,015 B2
(45) Date of Patent: Jun. 4, 2024

(54) STREAM CLASSIFICATION SERVICE (SCS) FOR MOBILE AND NETWORK CENTRIC END-TO-END WLAN QoS MANAGEMENT

(71) Applicant: Intel Corporation, Santa Clara, CA (US)

(72) Inventors: Necati Canpolat, Beaverton, OR (US); Ganesh Venkatesan, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 372 days.

(21) Appl. No.: 17/218,648

(22) Filed: Mar. 31, 2021

(65) Prior Publication Data

US 2021/0219186 A1 Jul. 15, 2021

Related U.S. Application Data

(60) Provisional application No. 63/006,844, filed on Apr. 8, 2020, provisional application No. 63/004,144, filed on Apr. 2, 2020.

(51) Int. Cl.
*H04W 28/24* (2009.01)
*H04W 8/24* (2009.01)
(Continued)

(52) U.S. Cl.
CPC ............ *H04W 28/24* (2013.01); *H04W 8/24* (2013.01); *H04W 28/0268* (2013.01); *H04W 84/12* (2013.01)

(58) Field of Classification Search
CPC ... H04W 28/24; H04W 8/24; H04W 28/0268; H04W 84/12; H04W 76/22
See application file for complete search history.

(56) References Cited

U.S. PATENT DOCUMENTS

2007/0291725 A1* 12/2007 Kowalski .............. H04W 72/20
370/338
2007/0297329 A1* 12/2007 Park ...................... H04W 28/24
370/230.1
(Continued)

OTHER PUBLICATIONS

"Wi-Fi Multimedia Technical Specification", [Online]. Retrieved from the Internet: URL: https: docplayer.net 51837859-Wi-fi-multimedia-technical-specification-with-wmm-power-save-and-wmm-admission-control.html, (2012), 2 pgs.
(Continued)

*Primary Examiner* — Ian N Moore
*Assistant Examiner* — Latresa A McCallum
(74) *Attorney, Agent, or Firm* — Schwegman Lundberg & Woessner, P.A.

(57) ABSTRACT

A station (STA) configured for Quality-of-Service (QoS) management performs a Simple Reflective QoS (SRQ) protocol with an access point (AP) (i.e., another QoS STA) for QoS management of a QoS flow. As part of the SRQ protocol to exchange QoS profiles, the STA may encode a request frame to include a first SRQ capabilities information element (IE) for transmission to the AP. The inclusion of the first SRQ capabilities IE indicating that the STA supports the SRQ protocol. The STA may also decode a response frame received from the AP. The response frame includes a second SRQ capabilities IE indicating that the AP supports the SRQ protocol. The STA may also determine a QoS profile for the QoS flow based on SRQ capabilities of the STA and the AP. The STA may also create a SRQ tuple based the QoS profile for initiating the QoS flow.

20 Claims, 9 Drawing Sheets

(51) Int. Cl.
    *H04W 28/02*     (2009.01)
    *H04W 84/12*     (2009.01)

(56) References Cited

U.S. PATENT DOCUMENTS

2019/0364555 A1* 11/2019 Huang ................. H04W 72/51
2020/0008185 A1* 1/2020 Chen ...................... H04L 69/18

OTHER PUBLICATIONS

"802.11-2016—IEEE Standard for Information technology part 1 of 2", Telecommunications and information exchange between systems Local and metropolitan area networks—Specific requirements—Part 11: Wireless LAN Medium Access Control (MAC) and Physical Layer (PHY) Specifications, (2016), 1988 pgs.

"802.11-2016—IEEE Standard for Information technology part 2 of 2", Telecommunications and information exchange between systems Local and metropolitan area networks—Specific requirements—Part 11: Wireless LAN Medium Access Control (MAC) and Physical Layer (PHY) Specifications, (2016), 1546 pgs.

* cited by examiner

STREAM CLASSIFICATION SERVICE (SCS) FOR MOBILE AND NETWORK CENTRIC END-TO-END WLAN QoS MANAGEMENT

PRIORITY CLAIM

This application claims the benefit of priority under 35 U.S.C. 119(e) to U.S. Provisional Patent Application Ser. No. 63/004,144, filed Apr. 2, 2020 and U.S. Provisional Patent Application Ser. No. 63/006,844, filed Apr. 8, 2020, which are incorporated herein by reference in their entireties.

TECHNICAL FIELD

Embodiments pertain to wireless communications. Some embodiments relate to quality-of-service (QoS) management in wireless local area networks (WLANs).

BACKGROUND

With the tremendous growth of Wi-Fi applications and networks, there is a growing need for enabling device-centric and network-centric end-to-end QoS capabilities in both managed and un-managed Wi-Fi networks. Currently, there is no solution that can support all the above requirements. Wi-Fi Alliance (WFA) optimized connectivity (OCE) QoS management working on addressing these requirements. Embodiments disclosed herein provide a complete solution to meet these functional requirements.

DETAILED DESCRIPTION

Figure 1:
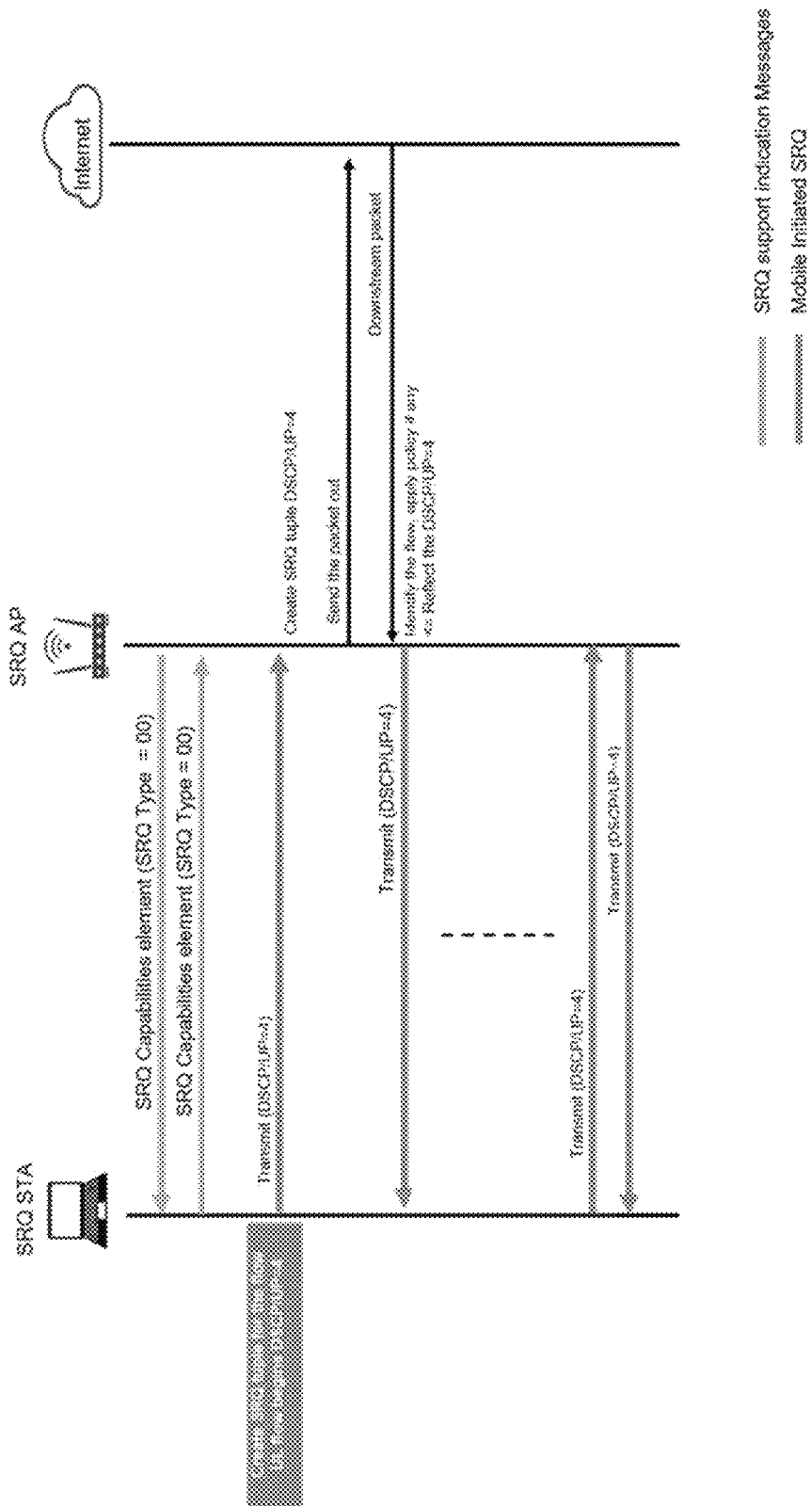
FIG. 1 illustrates Client Initiated SRQ without Negotiation in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

WFA WMM and 802.11e defines WLAN QoS support. However, they are not end-to-end mechanism. They are only used to indicate the QoS request from STA to AP and they also primarily target managed WLAN networks. WMM and IEEE 802.11 2016 solutions are limited to a one-way STA requesting AP to treat the downlink QoS. They lack the end-to-end WLAN QoS management.

Embodiments disclosed herein provide an end-to-end WLAN QoS management solution that will be incorporated in WFA OCE QoS certification. It has the following key capabilities:

End-to-End QoS Management

Gives both device and network ability to control QoS flow.

Single protocol supporting both UL and DL flow

Allows both no-negotiation and negotiation based QoS enablement options in support of different applications and networks.

Some embodiments are directed to a station (STA) configured for Quality-of-Service (QoS) management that performs a Simple Reflective QoS (SRQ) protocol with an access point (AP) (i.e., another QoS STA) for QoS management of a QoS flow. As part of the SRQ protocol to exchange QoS profiles, the STA may encode a request frame to include a first SRQ capabilities information element (IE) for transmission to the AP. The inclusion of the first SRQ capabilities IE indicating that the STA supports the SRQ protocol. The STA may also decode a response frame received from the AP. The response frame includes a second SRQ capabilities IE indicating that the AP supports the SRQ protocol. The STA may also determine a QoS profile for the QoS flow based on SRQ capabilities of the STA and the AP. The STA may also create a SRQ tuple based the QoS profile for initiating the QoS flow.

In some embodiments, the STA may encode the first SRQ capabilities IE to include: an SRQ type field to indicate whether the STA supports SRQ with negotiation (i.e., b0 of the SRQ type field) and indicate whether SRQ negotiation is required (i.e., b1 of the SRQ type field) prior to start of the QoS flow; a user priority (UP) mask to indicate which user priority values are subject to the SRQ protocol; and a traffic classification (TCLAS) Type Support field to indicate a type of TCAS supported for the QoS in the SRQ protocol.

In some embodiments, the request frame that includes the SRQ capabilities IE may be a Stream Classification Service Request frame and the response frame that includes the second SRQ capabilities IE may be a Stream Classification Service Response frame.

In some embodiments, the request frame that includes the SRQ capabilities IE may be an Association Request frame and the response frame that includes the second SRQ capabilities IE may be a beacon frame or a Probe Response frame.

In some embodiments, when the SRQ type field indicates that SRQ negotiation is required, the STA may perform a WiFi multi-media (WMM) add traffic stream (ADDTS) Request/Response frame exchange with the AP prior to the start of the QoS flow between the STA and the AP.

In some embodiments, when the SRQ type field indicates the SRQ negotiation is not required, the STA may refrain from performing the WMM ADDTS Request/Response frame exchange with the AP prior to the start of the QoS flow between the STA and the AP.

In some embodiments, when the AP does not support the SRQ protocol, the response frame may be received from the AP without the second SRQ capabilities IE.

In some embodiments, the SRQ tuple may be based on a Differentiated Services Code Point (DSCP) DSCP-UP mapping for the QoS flow.

In some embodiments, the TCLAS element is a classifier Type 4 configured in accordance with IEEE 802.11-2016.

In some embodiments, the QoS flow may be an upstream QoS flow initiated by the STA, and the STA may encode uplink QoS data frames for transmission to the AP in accordance with the QoS flow.

These embodiments are described in more detail below. Some embodiments may be integrated in Client and AP Wi-Fi products certified with WFA OCE QoS Management.

Simple Reflective QoS (SRQ) for Mobile and Network Centric End-to-End WLAN QoS Management WFA OCE TG is working on enabling end-to-end QoS Management with the main attributes to:
 a) Support both mobile device-centric and network-centric (or AP-centric) QoS management
 b) Support both unmanaged and un-managed WLAN use cases
 c) Support both negotiated and un-negotiated QoS management.

We propose a Simple Reflective QoS (SRQ) protocol that satisfies the attributes enumerated above. This protocol may use the TSPEC element defined in the WMM Specification along with the TCLAS element type=4 as specified in IEEE802.11-2016 specification. An SRQ Capabilities information element is defined below to indicate QoS Enhancement capabilities and corresponding attributes to the peer to which a frame that includes this element is transmitted. Some constraints placed on the ability to transmit ADDTS Request/Response frames based on the role played by the entity in the wireless network topology, namely STA or AP in IEEE802.11-2016 specification is relaxed in this proposal.

SRQ Capabilities Information Element

The Simple Reflective QoS (SRQ) Capabilities element is a Vendor Specific element as shown in Table-1 and the UP corresponding to the bit that is set to 0 is not subject to the behavior specified by the SRQ protocol. For instance, the pattern 11000000 indicates that the SRQ protocol applies only to UP6 and UP7.

Protocol Definition:

Capability Indication

A STA indicates support for the SRQ protocol by including a SRQ Capabilities element in the Association Request frame that it transmits to the AP. An AP indicates support for the SRQ protocol by including a SRQ Capabilities element in the Beacon and Probe Response frames. Upon successful association both the STA and the AP discover the SRQ QoS Capabilities of each other.

If the b0 subfield of the SRQ Type field is set to 0, then the STA and network can only use SRQ without Negotiation. If the b0 subfield of the SRQ Type field is set to 1 and b1 subfield of the SRQ Type field is set to 1 and in the SRQ Capabilities element included in the Beacon and/or the Probe Response from an AP; or the Association Request from a STA, the AP and STA require an explicit WMM ADDTS Request/Response frame exchange prior to the start of the QoS flow between the STA and the AP. Otherwise an explicit WMM ADDTS Request/Response frame exchange is not required and STA and AP may choose to use SRQ without Negotiation.

SRQ without Negotiation:

After the AP and the STA identify the SRQ capabilities of each other during the association procedure that completes successfully and determine the support for SRQ without Negotiation, either the AP or the STA may initiate the corresponding QoS flow as described in FIGS. 1 through 4. The QoS flow shall be prioritized and transmitted over the

TABLE 1

SRQ Capabilities element

| Field | Size | Value | | | | | | | | Description |
|---|---|---|---|---|---|---|---|---|---|---|
| Element ID | 1 | 0xDD | | | | | | | | Vendor Specific element ID |
| Length | 1 | 7 | | | | | | | | Length of the element body (in octets) |
| OUI | 3 | 0x50-6F-9A | | | | | | | | WFA OUI |
| OUI Type | 1 | to be assigned | | | | | | | | To be assigned |
| SRQ Type | 1 | b7 | b6 | 65 | b4 | b3 | b2 | b1 | b0 | b0: SRQ negotiation enabled/disabled |
| | | 0 | 0 | 0 | 0 | 0 | 0 | 0 | 0 | b1: SRQ negotiation required |
| | | 0 | 0 | 0 | 0 | 0 | 0 | 0 | 1 | bits 2 thru 7 are reserved |
| | | 0 | 0 | 0 | 0 | 0 | 0 | 1 | 1 | |
| UP-Mask | 1 | Bit-field | | | | | | | | Which UP requires QoS Management |
| TCLAS Type Support | 2 | Bit-field | | | | | | | | Indicates the type of TCLAS supported for QoS Management in SRQ. TCLAS Type as defined in IEEE802.11-2016 | b0 subfield of SRQ Type field indicates if the client or the network support SRQ with Negotiation.

If the client or the network support SRQ with Negotiation this subfield is set to 1; otherwise it is set to 0.

b1 subfield of SRQ Type field indicates if the client or the network requires a SRQ with Negotiation before the start of the corresponding QoS flow. If a negotiation is required prior to the transmission of QoS data frames corresponding to this QoS flow this subfield is set to 1; otherwise it is set to 0.

If the b0 subfield of SRQ Type field is set to 1 and the b1 subfield of SRQ Type field is set to 0 then it indicates that only SRQ without Negotiation is allowed.

The UP-Mask field is a 8-bit bit-pattern indicating which of the User Priority values (0 through 7) is subject to the SRQ protocol. The UP corresponding to the bit that is set to 1 is subject to the behavior specified by the SRQ protocol wireless link using the DSCP-UP mapping that is either the default DSCP-UP mapping or at the STA or the AP; or the DSCP-UP mapping that the STA received from the AP in the (Re)Association Response during (Re)Association and use it to set the UP in the corresponding QoS flow.

After receiving an unsolicited QoS data frame corresponding to the QoS flow, from the AP or the STA, the STA or the AP shall derive the classifier parameters such as Source/Destination IP Address and Ports, IP Protocol, IP Protocol Version, DSCP/UP tags, from the MAC and IP headers similar to TCLAS type-4 parameters, and use it to reflect corresponding QoS flow in the other direction.

At any time during the QoS flow, the STA or the AP may change the following classifier parameters Source/Destination IP Address and DSCP/UP tag; and use it in all subsequent QoS data frame exchanges corresponding to the SRQ without Negotiation. The recipient of the QoS data frame:

(a) shall update changes to Source/Destination IP Addresses, and (b) may update the DSCP/UP tag. If the DSCP/UP tag is not updated, the prioritization of the QoS data flow in the UL and DL directions may not be the same and hence no mirroring. If the DSCP/UP tag is updated, the prioritization of the QoS data in the UL and DL directions would be the same and hence mirrored.

Client Initiated SRQ without Negotiation

FIG. 1 illustrates Client Initiated SRQ without Negotiation in accordance with some embodiments.

Figure 2:
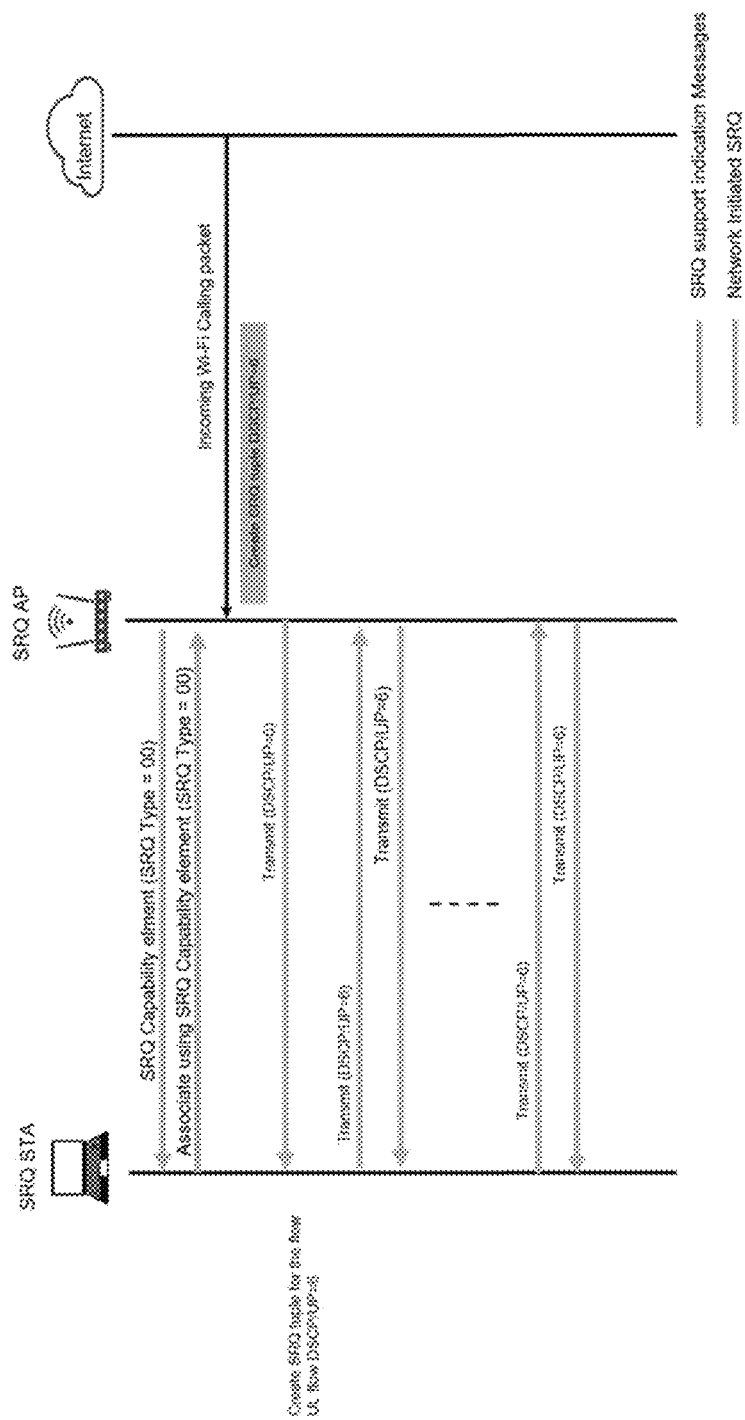
FIG. 2 illustrates Network Initiated SRQ without Negotiation in accordance with some embodiments.

AP includes WMM Information Element and SRQ Capabilities element in Beacons and Probe Responses
SRQ Capabilities IE indicates SRQ Type 00
STA include WMM Information Element and SRQ Capabilities element Association Request
Checks SRQ Capabilities IE in the Beacon/Probe Response and sets SRQ Capabilities IE indicates SRQ Type 00 in the Association Request
STA either has a default DSCP-UP mapping or receives one from the AP in the Association Response
The AP and the STA successfully associate
When a QoS flow that requires SRQ Management (as indicated in the UP-Mask field of the SRQ Capabilities element in the Association Request) is created corresponding to an application in the STA, the STA
Creates a SRQ tuple—SA/DA, Port and maps DSCP to UP—representing the flow (and matching STA's policy)
Starts sending QoS data frames corresponding to the flow to the AP
Note: no explicit exchange of WMM ADDTS Request[1]/Response with the AP
The AP on receipt of the STA-to-AP [UL] QoS data frames, constructs a corresponding SRQ tuple to manage corresponding DL flow
At a time when the application for which the flow was setup terminates, the STA and the AP release corresponding resources allocated to manage the QoS flow between the STA and the AP Network Initiated SRQ without Negotiation FIG. 2 illustrates Network Initiated SRQ without Negotiation in accordance with some embodiments.

AP includes WMM Information Element and SRQ Capabilities in Beacons and Probe Responses
SRQ Capabilities IE indicates SRQ Type 00
STA includes WMM Information Element and SRQ Capabilities element in Association Request
Checks SRQ Capabilities IE in the Beacon/Probe Response and sets SRQ Capabilities IE SRQ Type 00 in the Association Request
STA either has a default DSCP-UP mapping or receives one from the AP in the Association Response
The AP and the STA successfully associate
When a flow that requires SRQ Management (as indicated in the UP-Mask field of the SRQ Capabilities element in the Beacon/Probe Response) is created corresponding to an application at the network-side, the AP
Creates a SRQ tuple—SA/DA, Port and maps DSCP to UP—representing the flow (and matching Network Policy, Network load/operating conditions)
Starts sending [DL] QoS data frames corresponding to the flow to the STA
Note: no explicit exchange of WMM ADDTS Request/Response with the STA
The STA on receipt of the AP-to-STA [DL] QoS data frames, constructs a corresponding SRQ tuple to manage corresponding UL flow
At a time when the application for which the flow was setup terminates, the STA and the AP release corresponding resources allocated to manage the QoS flow between the STA and the AP Mid-Stream SRQ Flow Property Change in No Negotiation SRQ (Client or Network Initiated)

Figure 3:
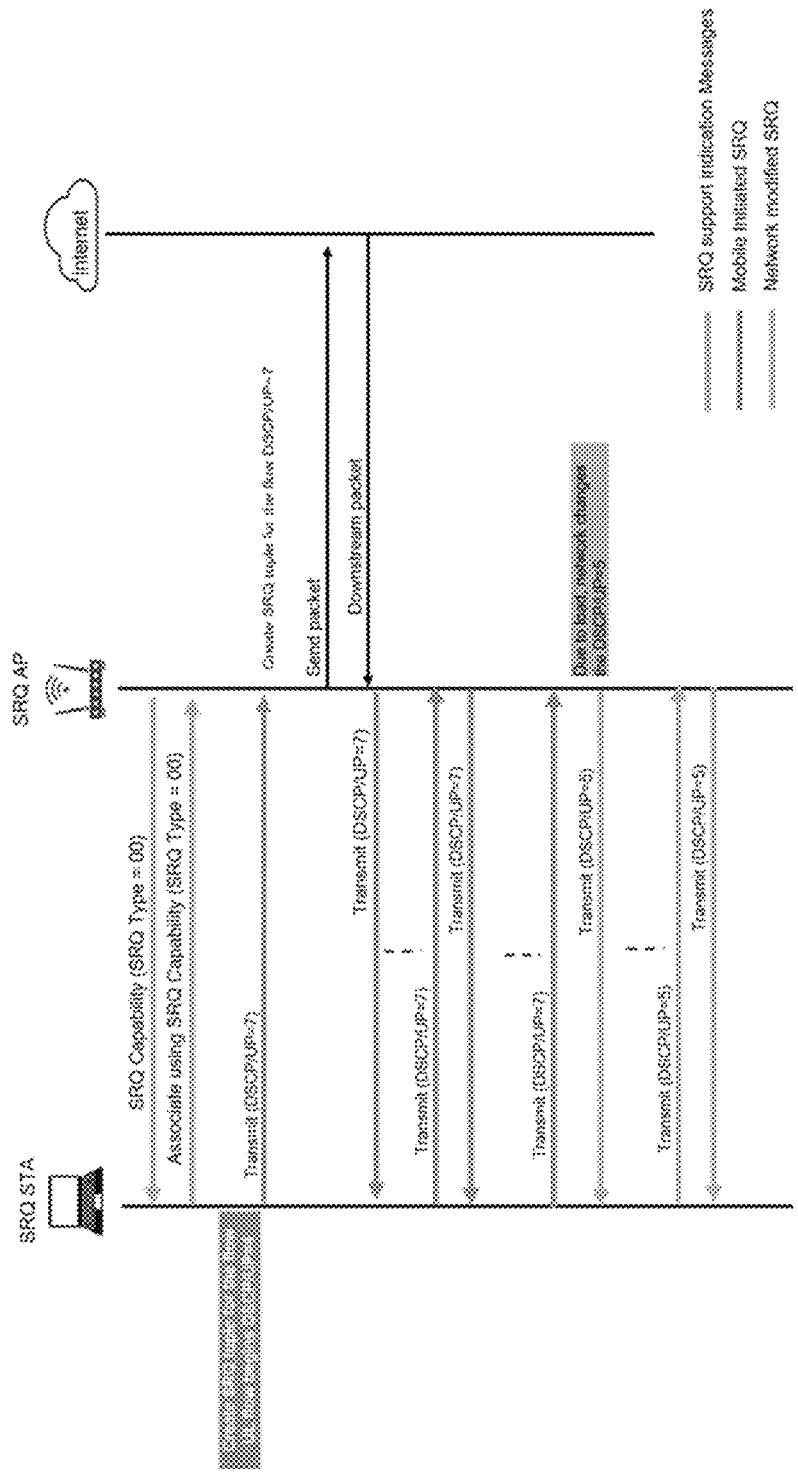
FIG. 3 illustrates Network changes SRQ flow property mid-stream in accordance with some embodiments.

FIG. 3 illustrates Network changes SRQ flow property mid-stream in accordance with some embodiments.

Figure 4:
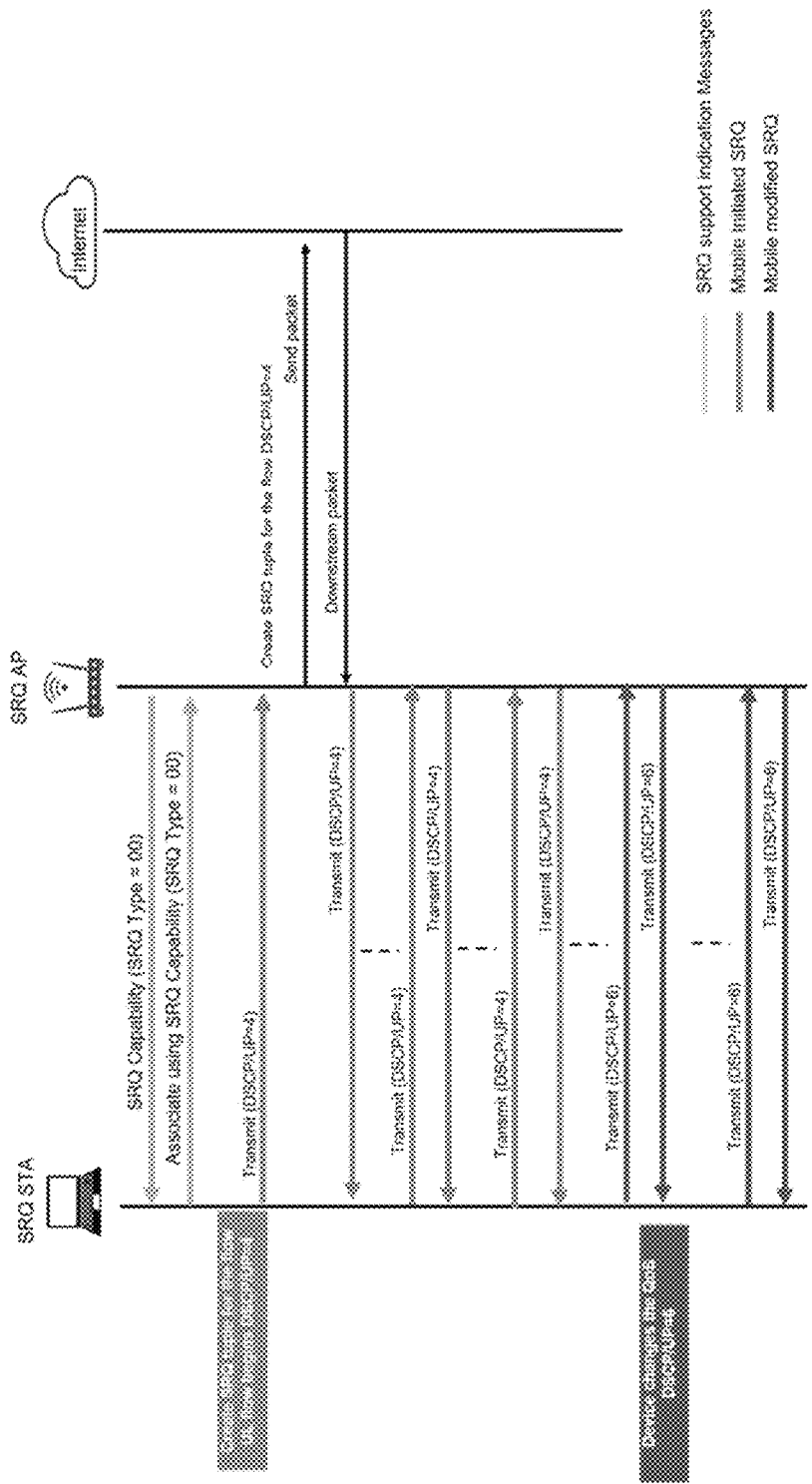
FIG. 4 illustrates Client changes SRQ flow property mid-stream in accordance with some embodiments.

AP includes WMM Information Element and SRQ Capabilities element in Beacons and Probe Responses
SRQ Capabilities IE indicates SRQ Type 00
STA includes WMM Information Element and SRQ Capabilities element in Association Request
Checks SRQ Capabilities IE in the Beacon/Probe Response and sets SRQ Capabilities IE SRQ Type 00 in the Association Request
STA either has a default DSCP-UP mapping or receives one from the AP in the Association Response
AP and STA successfully associate
When a flow that requires SRQ Management (as indicated in the UP-Mask field of the SRQ Capabilities element in the Beacon/Probe Response) is created corresponding to an application at the network-side, the AP (or the client-side, the STA)
Creates a SRQ tuple—SA/DA, Port and maps DSCP to UP—representing the flow (and matching local policy)
Starts sending QoS data frames corresponding to the flow to the AP (or STA)
Note: no explicit exchange of WMM ADDTS Request/Response with the AP FIG. 4 illustrates Client changes SRQ flow property mid-stream in accordance with some embodiments.

The AP (or STA) on receipt of the STA-to-AP [UL] (or AP-to-STA [DL]) QoS data frames, constructs a corresponding SRQ tuple to manage corresponding DL (or UL) flow
The AP (or STA) updates [DL] or [UL] QoS data prioritization due to updated Network Policy or changes in the Network operating conditions/load (or STA policy/load/operating conditions) by
Updating the local SRQ tuple representing the QoS flow
Using the updated priority in all subsequent [DL] (or [UL]) QoS data frames corresponding to the flow
The STA (or AP) on receipt of the [DL] (or [UL]) QoS data corresponding to the flow may
Update the local SRQ tuple and use it to manage corresponding UL (or [DL]) QoS data
Ignore the change and manage UL (or DL) QoS data prioritization using the existing (non-updated) SRQ tuple
At a time when the application for which the flow was setup terminates, the STA and the AP release corresponding resources allocated to manage the QoS flow between the STA and the AP SRQ with Negotiation In order to set up a SRQ with Negotiation, both the AP and the STA shall include an SRQ Capabilities element (in the Beacon/Probe Response or in the Association Request) where the SRQ Type field indicates that negotiation is enabled (b0 subfield of the SRQ Type field is set to 1). An SRQ with Negotiation is established when an AP and a STA successfully[2] complete an WMM ADDTS Request/Response exchange.

The WMM ADDTS Request may be initiated either by the AP or the STA depending on which ends initiates the corresponding QoS traffic. When the STA initiates the WMM ADDTS Request the normative behavior governing the contents of the WMM ADDTS Request and corresponding WMM ADDTS Response from the AP are as described in the WMM Specification. The following constraints apply:
- (a) A TCLAS of type-4 shall be included in the WMM ADDTS Request
- (b) The following fields in the WMM TSPEC element included in the ADDTS Request are reserved: Nominal MSDU Size, Minimum Service Interval, Maximum Service Interval, Inactivity Interval, Service Start Time, Minimum Data Rate, Mean Data Rate, Peak Data Rate, Surplus Bandwidth Allowance and Medium Time fields are reserved
- (c) Suspension Interval is in units of seconds indicating the maximum time without any QoS data transfer corresponding to the TID; and when set to 0 indicates that the corresponding traffic is not terminated due to inactivity When the AP initiates the WMM ADDTS Request, the AP allocates resources corresponding to the request and assigns a TID for the QoS flow and sets the TID field of the WMM TSPEC element included in the WMM ADDTS Request. The TID along with the TA and the RA of the WMM ADDTS Request frame uniquely identifies the Traffic Stream. The corresponding WMM ADDTS Response from the STA shall set the status code field to Refused (3) or Admission accepted (0).

Figure 5:
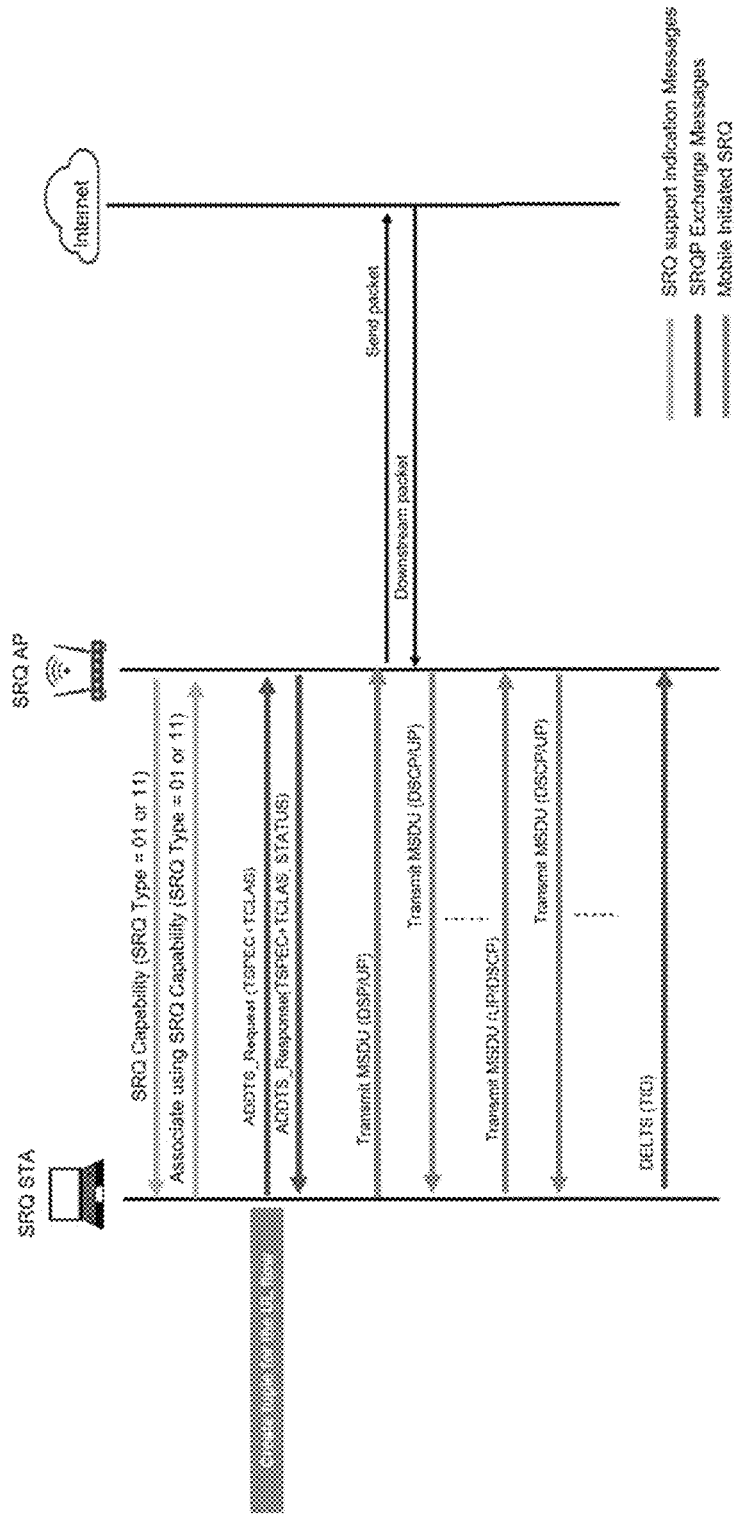
FIG. 5 illustrates Client initiated SRQ with Negotiation in accordance with some embodiments.
Figure 6:
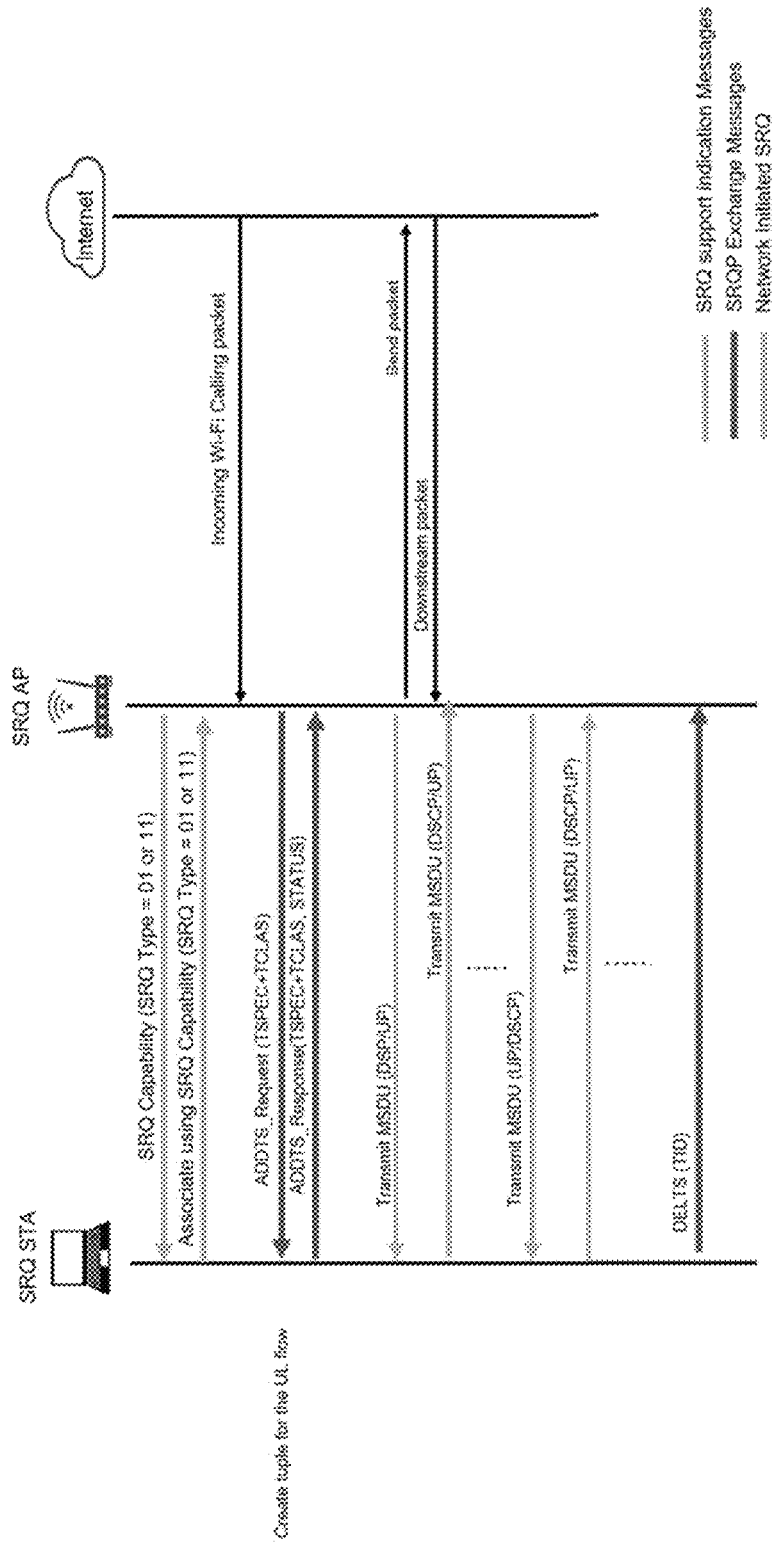
FIG. 6 illustrates Network Initiated SRQ with Negotiation in accordance with some embodiments.
Figure 7:
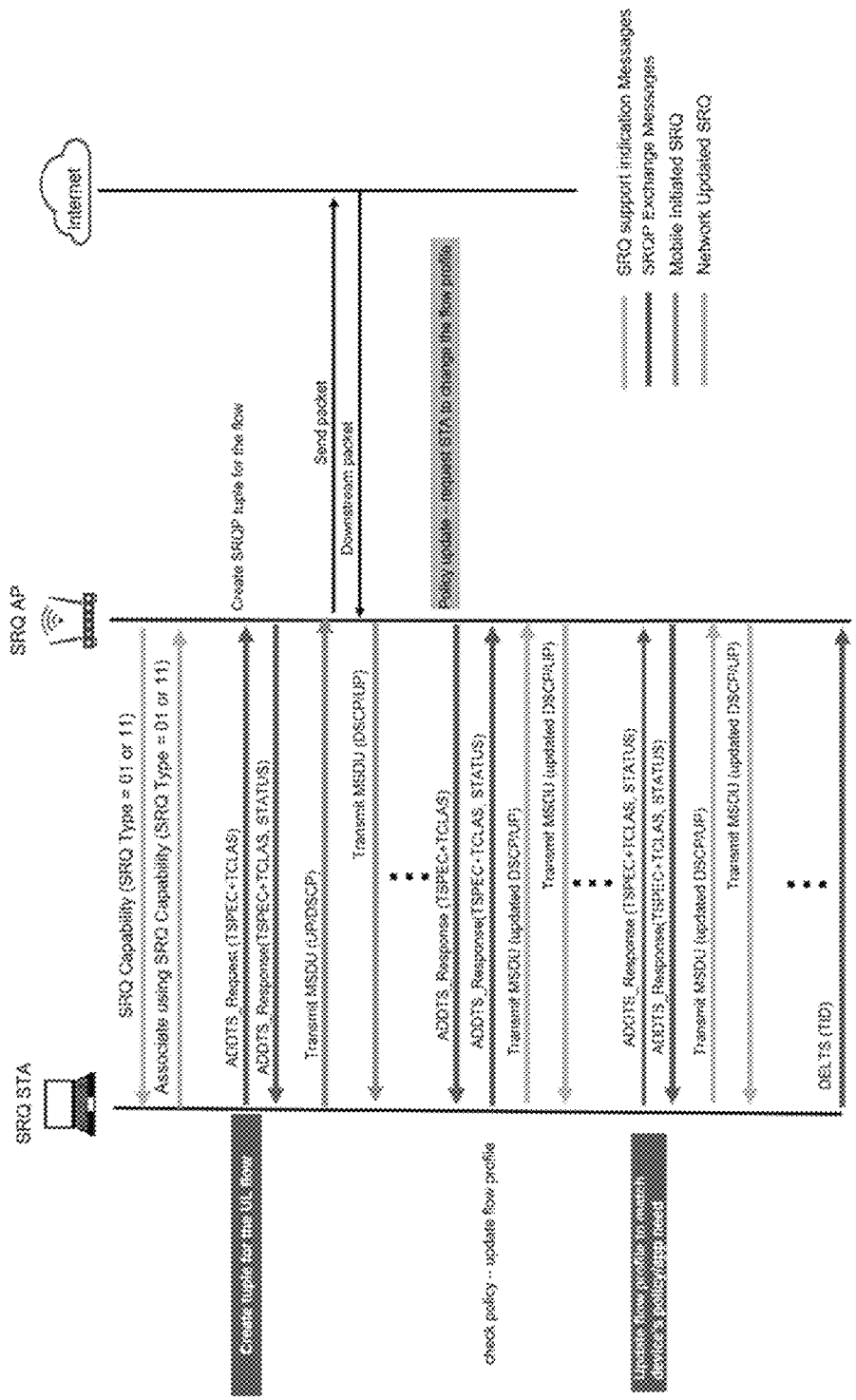
FIG. 7 illustrates Updating SRQ Flow Parameters of a SRQ with Negotiation in accordance with some embodiments.

If a WMM ADDTS Request/Response exchange has successfully completed between the AP and the STA, the STA or the AP may at any time perform the following:
- transmit a WMM ADDTS Response frame with one of more fields of the TCLAS element associated with the TID in the included WMM TSPEC element updated.
- Transmit a DELTS Request frame to terminate the corresponding TID FIGS. 5 through 7 describe the setup, update and tear down of the SRQ flow.

Client Initiated SRQ with Negotiation:

FIG. 5 illustrates Client initiated SRQ with Negotiation in accordance with some embodiments.
- AP includes WMM Information element and SRQ Capability element in Beacons and Probe Responses
  - SRQ Capabilities IE indicates SRQ Type 01 or 11
- STA includes WMM Information element and SRQ Capabilities element in Association Request
  - Checks SRQ Capabilities IE in the Beacon/Probe Response and sets SRQ Capabilities IE indicates SRQ Type 01 or 11 in the Association Request
- The AP and the STA successfully associate
- Prior to starting a QoS flow requiring SRQ Management, the STA transmits a WMM ADDTS Request with the fields in the included WMM TSPEC element and TCLAS element in the request matching the characteristics of the QoS flow, to the AP
- Assuming that the AP has enough resources to support the request flow and the requested flow conforms with the corresponding Network Policy, the AP respond with a WMM ADDTS Response with the Status field set to Admission accepted (0) and the TID field in the TSPEC element set to an ID assigned to the flow by the AP.
- For all UL QoS flow corresponding to the TID from the previous step the STA prioritizes the corresponding QoS data frames as defined in the WMM ADDTS Request/Response exchange.
- For all the DL QoS flow corresponding to the TID, the AP prioritizes the corresponding QoS data frames as defined in the WMM ADDTS Request/Response exchange.
- At a time when the application for which the flow was setup terminates, the STA or the AP transmit a DELTS frame with the corresponding TID to release resources allocated to manage the QoS flow between the STA and the AP Network Initiated SRQ with Negotiation FIG. 6 illustrates Network Initiated SRQ with Negotiation in accordance with some embodiments.
- AP includes WMM Information element and SRQ Capability element in Beacons and Probe Responses
  - SRQ Capabilities IE indicates SRQ Type 01 or 11
- STA includes WMM Information element and SRQ Capabilities element in Association Request
  - Checks SRQ Capabilities IE in the Beacon/Probe Response and sets SRQ Capabilities IE indicates SRQ Type 01 or 11 in the Association Request
- The AP and the STA successfully associate
- Prior to starting a QoS flow requiring SRQ Management, the AP transmits a WMM ADDTS Request with the fields in the WMM TSPEC and TCLAS elements in the request matching the characteristics of the QoS flow, to the AP. The AP assigns a TID to the SRQ flow and indicates the assigned TID using the TID field in the WMM TSPEC element included in the WMM ADDTS Request
- Assuming that the requested flow conforms with the corresponding Client Policy, the STA responds with an ADDTS Response with the Status field set to Admission accepted (0).
- For all UL QoS flow corresponding to the TID from the previous step the STA prioritizes the corresponding QoS data frames as defined in the WMM ADDTS Request/Response exchange.
- For all the DL QoS flow corresponding to the TID, the AP prioritizes the corresponding QoS data frames as defined in the WMM ADDTS Request/Response exchange.
- At a time when the application for which the flow was setup terminates, the STA or the AP transmit a DELTS frame with the corresponding TID to release resources allocated to manage the QoS flow between the STA and the AP Updating the Parameters of a SRQ with Negotiation:

FIG. 7 illustrates Updating SRQ Flow Parameters of a SRQ with Negotiation in accordance with some embodiments.
- AP includes WMM Information element and SRQ Capability element in Beacons and Probe Responses
  - SRQ Capabilities IE indicates SRQ Type 01 or 11
- STA includes WMM Information element and SRQ Capabilities element in Association Request
  - Checks SRQ Capabilities IE in the Beacon/Probe Response and sets SRQ Capabilities IE indicates SRQ Type 01 or 11 in the Association Request
- The AP and the STA successfully associate
- Prior to starting a QoS flow requiring SRQ Management, the STA transmits an WMM ADDTS Request with the fields in the WMM TSPEC and TCLAS elements in the request matching the characteristics of the QoS flow, to the AP Assuming that the AP has enough resources to support the request flow and the requested flow conforms with the corresponding Network Policy, the AP responds with an WMM ADDTS Response with the Status field set to Admission accepted (0) and the TID field in the WMM TSPEC element set to an ID assigned to the flow by the AP.

For all UL QoS flow corresponding to the TID from the previous step the STA prioritizes the corresponding QoS data frames as defined in the WMM ADDTS Request/Response exchange.

For all the DL QoS flow corresponding to the TID, the AP prioritizes the corresponding QoS data frames as defined in the WMM ADDTS Request/Response exchange.

At any time during the SRQ flow corresponding to the negotiated SRQ, the AP or the STA may require an update to the classifier associated with the flow. The update may be initiated by the STA or the AP using an unsolicited ADDTS Response with the TID in the TSPEC element indicated the TID for which the classifier parameters are updated and the corresponding updated TCLAS element. Note that the WMM TSPEC parameters cannot be modified.

At a time when the application for which the flow was setup terminates, the STA or the AP transmit a DELTS frame with the corresponding TID to release resources allocated to manage the QoS flow between the STA and the AP Transitioning from No Negotiation to SRQ with Negotiation Mid-Stream In some use cases since not all classifier parameters are known in advance, it may be convenient to start with a SRQ without Negotiation and discover all the classifier parameters as the QoS flow proceeds. When all the classifier parameters are discovered, the AP or the STA can then switch from the SRQ without Negotiation to an SRQ with Negotiated by completing a WMM ADDTS Request/Response exchange mid-stream.

When a QoS traffic is initiated between the AP and the STA without an explicit exchange of WMM ADDTS Request/Response, the STA or the AP may at any time transmit an WMM ADDTS Request frame to the peer with a WMM TSPEC and a TCLAS of type-4 describe the QoS traffic. The peer shall respond with a corresponding WMM ADDTS Response.

Figure 8:
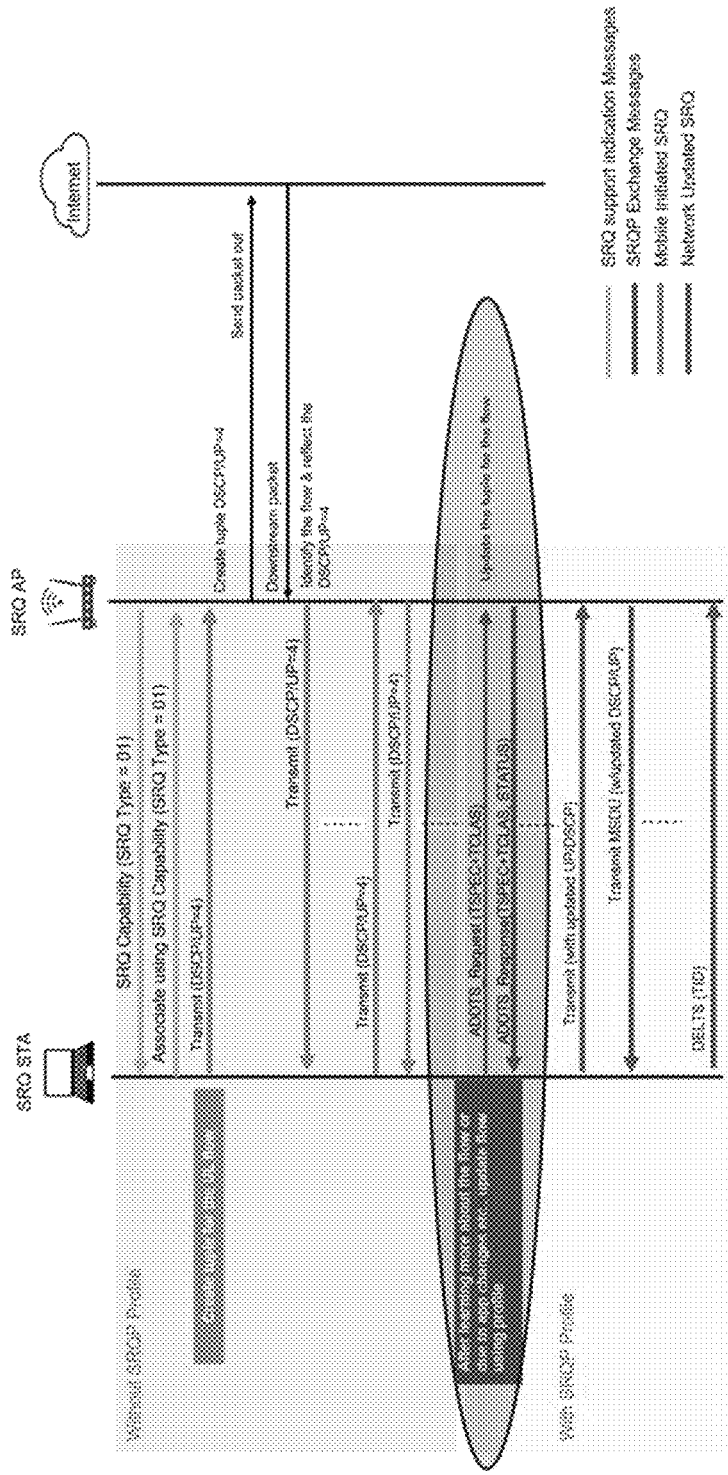
FIG. 8 illustrates Transition from non-Negotiated SRQ to a Negotiated SRQ in accordance with some embodiments.

FIG. 8 illustrates Transition from non-Negotiated SRQ to a Negotiated SRQ in accordance with some embodiments.
AP includes WMM Information element and SRQ Capability element in Beacons and Probe Responses
SRQ Capabilities IE indicates SRQ Type 01 or 11
STA includes WMM Information element and SRQ Capabilities element in Association Request
Checks SRQ Capabilities IE in the Beacon/Probe Response and sets SRQ Capabilities IE indicates SRQ Type 01 or 11 in the Association Request
STA either has a default DSCP-UP mapping or receives one from the AP in the Association Response
The AP and the STA successfully associate
When a flow that requires SRQ Management (as indicated in the UP-Mask field of the SRQ Capabilities element in the Beacon/Probe Response) is created corresponding to an application at the network-side, the AP
Creates a SRQ tuple—SA/DA, Port and maps DSCP to UP—representing the flow (and matching Network Policy, Network load/operating conditions)
Starts sending [DL] QoS data frames corresponding to the flow to the STA
Note: no explicit exchange of WMM ADDTS Request/Response with the STA
The STA on receipt of the AP-to-STA [DL] QoS data frames, constructs a corresponding SRQ tuple to manage corresponding UL flow
The classifier parameters get discovered at both the AP and at the STA as the QoS flow proceeds. At a time when the AP or the STA has a complete set of classifier parameters, the STA or the AP transmits an WMM ADDTS Request with the fields in the WMM TSPEC and TCLAS elements in the request matching the characteristics of the QoS flow, to the AP or the AP.
The peer responds with an WMM ADDTS Response accepting the updated classifier parameters (or rejecting the update).
The QoS flow proceeds with the updated classifier parameters
At a time when the application for which the flow was setup terminates, the STA or the AP transmit a DELTS frame with the corresponding TID to release resources allocated to manage the QoS flow between the STA and the AP.

The IEEE 802.11e and Wi-Fi Alliance (WFA) WMM specified the TSPEC (traffic specification) to define quality of service (QoS) characteristics of a data flow and TCLAS to classify the traffic MSDUs as belonging to a particular traffic stream. They have been available since 2015, but TSPEC has had only a very limited implementation and TCLAS has no implementation in the industry. They are overly complex and cumbersome, and applications typically do not have the required information ready to make use of them. WFA OCE QoS Management work is looking into QoS issues and addressing them. Hence, one of the key item is defining a new end-to-end WLAN QoS profile that could meet the application and WLAN network needs of today and can be expended for the future use cases such as TSN. In this disclosure, a new simple WLAN QoS profile is proposed that can provide a simple QoS profile that can be used by mobile devices and WLAN network for OCE "End-to-End" QoS management solution.

IEEE 802.11e, WMM TSPEC and TCLAS are the current solutions have been available since 2005. They have been available for 15 years with a very limited implementation of TSPEC and no implementation of TCLAS. They have many issues from the practicality points. When applications start flows, most often they do not have the required information available to fill out TSPEC parameter to be used in the QoS treatment of the flow. Hence, industry stayed away from implementing and supporting TSPEC and TCLAS.

Example embodiments of the present disclosure relate to systems, methods, and devices for OCE E2E WLAN QoS Management profile.

In one embodiment, a QoS management profile system may define a simple WLAN QoS profile that could be used for end-to-end mobile device and network centric QoS management. It captures the essential fields for QoS flow classification and also traffic characteristics for AP scheduling and prioritizing. The profile could be created and updated by both mobile device and network. It also has extensible fields for future use cases.

The WLAN QoS profile described here will support all the required functionalities above supporting all the applications, devices and networks. It specifies only the essential characteristics of traffic and classification of the flow.

Currently specified TSPEC and TCLAS have been too complicated and impeding implementation, and support of WLAN QoS across networks, device types and applications for many years. WFA OCE QoS Management is working on addressing the issues surrounding WLAN QoS. Hence, it is developing new WLAN QoS profile mechanisms to provide the capability needed. It can be supported by applications, devices and networks with simpler implementation, support and deployments. The WLAN QoS profile specified below will be used within the context of OCE.

In WFA OCE QoS Management specification, before a flow could be treated for QoS, the STA and AP will first need to exchange WLAN QoS profile as shown in the table below:

| Fields | Size (octet) | Value | Mandatory/ Optional | Description |
|---|---|---|---|---|
| Flow ID | 2 | | M | Unique identifier for the flow |
| IP Version | 1 | | M | IP 4 or IP 6 |
| Protocol | 1 | | M | IP protocols-UDP, TCP, ICMP etc. |
| Source IP Address | 4 or 16 | | M | IP address of the device |
| Source Port | 2 | | M | Port of the source application |
| Destination IP Address | 4 or 16 | | M | IP address of the destination |
| Destination Port | 2 | | M | Destination port |
| DSCP | 1 | 0-63 | M | DSCP value for the priority setting |
| Operation | 1 | 0-3 | M | 0 = Create, 1 = Response, 2 = Delete, 3 = Update |
| Status | 1 | 0-3 | M | 0 = Accept, 1 = Reject, 2 = Recommend, 3 = Update |
| Reason | 1 | 0-2 | M | NW Load, Policy, Flow Completed |
| Profile Lifetime | 1 | | M | Lifetime for flow-in sec. |
| Max MSDU size | 2 | | O | Maximum size of MSDU |
| Latency | 1 | | O | Expected worst case latency in ms. |
| Jitter | 1 | | O | (variation in latency) Network jitter in ms. |
| Direction (TBD) | 1 | 0-2 | O | 0 = UL, 1 = DL, 2 = bi-directional |
| Reserved | Reserved | | | Reserved |

Flow ID identifies the QoS flow for a given profile.

IP version, IP Protocol, Source and Destination Address and Port numbers create a tuple to classify the flow. When a flow is initiated by an application, the application or OS can fill out these fields in the profile.

Application or OS can specify QoS priority in DCSP field. DCSP can be converted to UP by using a default DSCP to UP mapping or it can be retrieved from AP after association.

Operation, Status and Reason field are use processing of the profile by both STA and AP. If the STA creates a profile, it sets the Operation to Create to indicate that this is a new profile. When AP receives the profile, it sets Operation to Respond and status to Accept, Reject or recommend with Reason for the status setting and responds to STA.

Profile lifetime indicates the lifetime of the flow that this profile will be applied. If it is set to zero, it indicates infinite lifetime.

The remaining fields Max MSDU size, Latency, and Jitter are optional. If application knows the values for any or all of the parameters including Max MSDU size, Latency, and Jitter, any or all of them can be set in the profile so that AP can allocate required resources and provide scheduling for them. Direction indicates if the profile will be applied to uplink, downlink or both. The Reserved field is kept for the future extensions.

Figure 9:
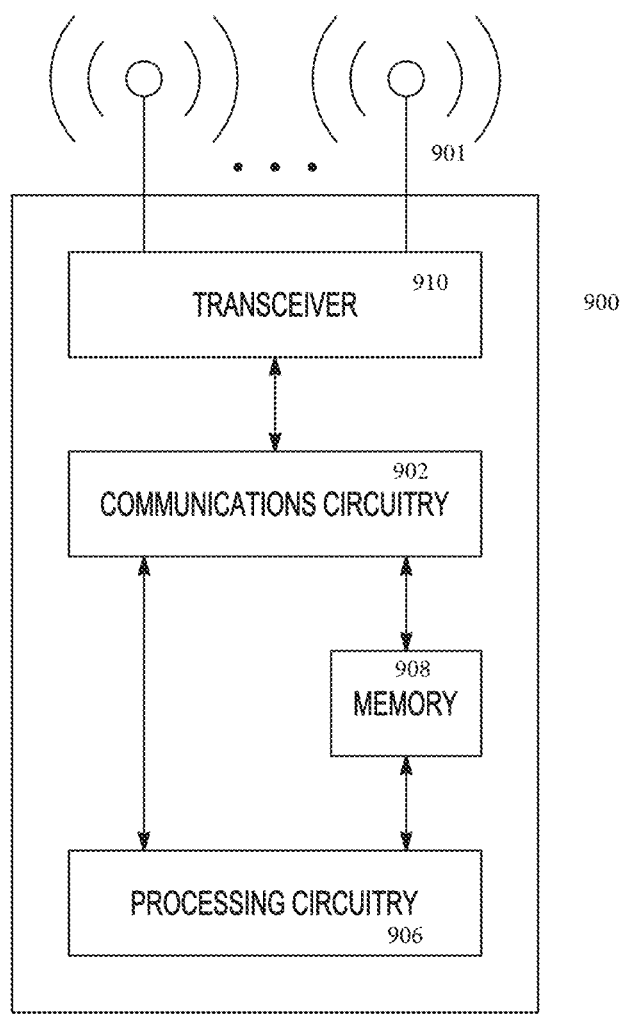
FIG. 9 is a functional block diagram of a station in accordance with some embodiments.

FIG. 9 is a functional block diagram of a station in accordance with some embodiments. In one embodiment, FIG. 9 illustrates a functional block diagram of a communication station that may be suitable for use as an access point (AP), a STA or other user device in accordance with some embodiments. The communication station 900 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station (STA) 900 may include communications circuitry 902 and a transceiver 910 for transmitting and receiving signals to and from other communication stations using one or more antennas 901. The communications circuitry 902 may include circuitry that can operate the physical layer (PHY) communications and/or medium access control (MAC) communications for controlling access to the wireless medium, and/or any other communications layers for transmitting and receiving signals. The communication station 900 may also include processing circuitry 906 and memory 908 arranged to perform the operations described herein. In some embodiments, the communications circuitry 902 and the processing circuitry 906 may be configured to perform operations detailed in the above figures, diagrams, and flows.

In accordance with some embodiments, the communications circuitry 902 may be arranged to contend for a wireless medium and configure frames or packets for communicating over the wireless medium. The communications circuitry 902 may be arranged to transmit and receive signals. The communications circuitry 902 may also include circuitry for modulation/demodulation, upconversion/downconversion, filtering, amplification, etc. In some embodiments, the processing circuitry 906 of the communication station 900 may include one or more processors. In other embodiments, two or more antennas 901 may be coupled to the communications circuitry 902 arranged for sending and receiving signals. The memory 908 may store information for configuring the processing circuitry 906 to perform operations for configuring and transmitting message frames and performing the various operations described herein. The memory 908 may include any type of memory, including non-transitory memory, for storing information in a form readable by a machine (e.g., a computer). For example, the memory 908 may include a computer-readable storage device, read-only memory (ROM), random-access memory (RAM), magnetic disk storage media, optical storage media, flash-memory devices and other storage devices and media.

In some embodiments, the communication station 900 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 900 may include one or more antennas 901. The antennas 901 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 900 may include one or more of a keyboard, a display, a non-volatile memory port, multiple antennas, a graphics processor, an application processor, speakers, and other mobile device elements. The display may be an LCD screen including a touch screen.

Although the communication station 900 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 900 may refer to one or more processes operating on one or more processing elements.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE 802.11-2016 is incorporated herein by reference. IEEE draft specification IEEE P802.11ax/D4.0, February 2019 is incorporated herein by reference in its entirety. In some embodiments, the AP and STAs may be directional multi-gigabit (DMG) STAs or enhanced DMG (EDMG) STAs configured to communicate in accordance with IEEE 802.11ad standard or IEEE draft specification IEEE P802.11ay, February 2019, which is incorporated herein by reference.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a Access Point Station (AP), the apparatus comprising: processing circuitry; and memory, wherein the processing circuitry is configured to:
   encode a Capabilities element for transmission to a station (STA) to indicate that the AP supports Quality-of-Service (QoS) traffic flow;
   decode a Stream Classification Service request frame received from the STA requesting establishment of an QoS flow with the AP, the Stream Classification Service request frame including a first characteristics element that describes QoS characteristics of the QoS flow,
   wherein the first Characteristics element includes at least a Minimum Data Rate, Minimum Service Interval, a Maximum Service Interval, a Service Start Time, a Medium Time and a direction, the direction being one of downlink and uplink;
   encode an Stream Classification Service response frame for transmission to the STA,
   wherein when the request for establishment of the QoS flow is rejected by the AP, the processing circuitry is configured to encode the Stream Classification Service response frame to include a second characteristics element providing recommended characteristics for the QoS flow,
   wherein the recommended characteristics signaled by the second characteristics element include to one or more of the Minimum Service Interval, the Maximum Service Interval, the Service Start Time, and the Medium Time, and
   when the direction of the QoS flow is uplink, the processing circuitry is configured to enable transmission of uplink frames of the QoS flow from the STA to meet the minimum data rate requested in the first characteristics element.

2. The apparatus of claim 1, when the direction of the QoS flow is uplink, the processing circuitry is configured to enable transmission of uplink frames of the QoS flow from the STA to meet the minimum data rate requested in the first characteristics element in accordance with:
   an interval between the Minimum and Maximum Service Intervals signaled in the first characteristics element when the second characteristics element was not included in the Stream Classification Service response frame.

3. The apparatus of claim 2, when the direction of the QoS flow is uplink, the processing circuitry is configured to enable transmission of uplink frames of the QoS flow from the STA to meet the minimum data rate requested in the first characteristics element further in accordance with:
an interval between the Minimum and Maximum Service Intervals signaled in the second characteristics element when the second characteristics element was included in the Stream Classification Service response frame.

4. The apparatus of claim 3, wherein when the direction of the QoS flow is downlink, the processing circuitry is configured to schedule transmission of downlink frames of the QoS flow to the STA to meet the the minimum data rate requested in the first characteristics element.

5. The apparatus of claim 4, wherein when the request for establishment of the QoS flow is accepted by the AP, the processing circuitry is configured to encode the Stream Classification Service response frame without the second characteristics element signalling the recommended characteristics for the QoS flow.

6. The apparatus of claim 5, wherein when the AP does not support QoS traffic transfer using an SCS, the processing circuitry is configured to encode the Capabilities element for transmission to the STA to indicate that the AP does not support QoS traffic transfer using an SCS.

7. The apparatus of claim 6, wherein when the AP has indicated that the AP does not support QoS traffic, the Stream Classification Service request frame received from the STA requesting establishment of an QoS flow with the AP is expected to be devoid of the first characteristics element that describes QoS characteristics of the QoS flow.

8. The apparatus of claim 7, wherein prior to a start of the QoS flow, the processing circuitry is configured to perform an add traffic stream (ADDTS) Request/Response frame exchange with the STA.

9. The apparatus of claim 4, wherein the processing circuitry is further configured to decode a first traffic classification (TCLAS) element received in the Stream Classification Service request frame.

10. The apparatus of claim 9, wherein when the request for establishment of the QoS flow is rejected by the AP, the processing circuitry is configured to encode the Stream Classification Service response frame to include a second TCLAS element.

11. A non-transitory computer-readable storage medium that stores instructions for execution by processing circuitry of an Access Point Station (AP), the processing circuitry configured to:
encode a Capabilities element for transmission to a station (STA) to indicate that the AP supports a Quality-of-Service (QoS) flow;
decode an Stream Classification Service request frame received from the STA requesting establishment of the QoS flow with the AP, the Stream Classification Service request frame including a first characteristics element that describes QoS characteristics of the QoS flow,
wherein the first Characteristics element includes at least a Minimum Data Rate, Minimum Service Interval, a Maximum Service Interval, a Service Start Time, a Medium Time and a direction, the direction being one of downlink and uplink;
encode an Stream Classification Service response frame for transmission to the STA,
wherein when the request for establishment of the QoS flow is rejected by the AP, the processing circuitry is configured to encode the Stream Classification Service response frame to include a second characteristics element providing recommended characteristics for the QoS flow,
wherein the recommended characteristics signaled by the second characteristics element include to one or more of the Minimum Service Interval, the Maximum Service Interval, the Service Start Time, and the Medium Time, and
when the direction of the QoS flow is uplink, the processing circuitry is configured to enable transmission of uplink frames of the QoS flow from the STA to meet the minimum data rate requested in the first characteristics element.

12. The non-transitory computer-readable storage medium of claim 11, when the direction of the QoS flow is uplink, the processing circuitry is configured to enable transmission of uplink frames of the QoS flow from the STA to meet the minimum data rate requested in the first characteristics element in accordance with:
an interval between the Minimum and Maximum Service Intervals signaled in the first characteristics element when the second characteristics element was not included in the Stream Classification Service response frame.

13. The non-transitory computer-readable storage medium of claim 12, when the direction of the QoS flow is uplink, the processing circuitry is configured to enable transmission of uplink frames of the QoS flow from the STA to meet the minimum data rate requested in the first characteristics element further in accordance with:
an interval between the Minimum and Maximum Service Intervals signaled in the second characteristics element when the second characteristics element was included in the Stream Classification Service response frame.

14. The non-transitory computer-readable storage medium of claim 13, wherein when the direction of the QoS flow is downlink, the processing circuitry is configured to schedule transmission of downlink frames of the QoS flow to the STA to meet the minimum data rate requested in the first characteristics element.

15. The non-transitory computer-readable storage medium of claim 14, wherein when the request for establishment of the QoS flow is accepted by the AP, the processing circuitry is configured to encode the Stream Classification Service response frame without the second characteristics element signalling the recommended characteristics for the QoS flow.

16. The non-transitory computer-readable storage medium of claim 15, wherein when the AP does not support QoS traffic transfer using an SCS, the processing circuitry is configured to encode the Capabilities element for transmission to the STA to indicate that the AP does not support QoS traffic transfer using an SCS.

17. The non-transitory computer-readable storage medium of claim 16, wherein when the AP has indicated that the AP does not support QoS traffic transfer, the Stream Classification Service request frame received from the STA requesting establishment of an QoS flow with the AP is expected to be devoid of the first characteristics element that describes QoS characteristics of the QoS flow.

18. An apparatus of a Non-Access Point Station (STA), the apparatus comprising: processing circuitry; and memory, wherein the processing circuitry is configured to:
decode a Capabilities element received from an Access Point Station (AP) indicating that the AP supports Quality-of-Service (QoS) traffic transfer using a Stream Classification Service (SCS);
encode an Stream Classification Service request frame for transmission to AP requesting establishment of an QoS flow with the AP, the Stream Classification Service request frame including a first characteristics element that describes QoS characteristics of the QoS flow, wherein the first Characteristics element includes at least a Minimum Data Rate, Minimum Service Interval, a Maximum Service Interval, a Service Start Time, a Medium Time and a direction, the direction being one of downlink and uplink;

decode an Stream Classification Service response frame received from the AP, wherein when the request for establishment of the QoS flow is rejected by the AP, the Stream Classification Service response frame includes a second characteristics element providing recommended characteristics for the QoS flow, wherein the recommended characteristics signaled by the second characteristics element include to one or more of the Minimum Service Interval, the Maximum Service Interval, the Service Start Time, and the Medium Time, and when the direction of the QoS flow is uplink, transmission of uplink frames of the QoS flow from the STA to the AP is enabled by the AP to meet the minimum data rate requested in the first characteristics element.

19. The apparatus of claim 18, when the direction of the QoS flow is uplink, transmission of uplink frames of the QoS flow from the STA is enabled by the AP to meet the minimum data rate requested in the first characteristics element in accordance with:

an interval between the Minimum and Maximum Service Intervals signaled in the first characteristics element when the second characteristics element was not included in the Stream Classification Service response frame; and an interval between the Minimum and Maximum Service Intervals signaled in the second characteristics element when the second characteristics element was included in the Stream Classification Service response frame.

20. The apparatus of claim 19, wherein when the direction of the QoS flow is downlink, transmission of downlink frames of the QoS flow to the STA is scheduled to meet the minimum data rate requested in the first characteristics element.

* * * * *

UNITED STATES PATENT AND TRADEMARK OFFICE
CERTIFICATE OF CORRECTION

| | | |
|---|---|---|
| PATENT NO. | : 12,004,015 B2 | Page 1 of 1 |
| APPLICATION NO. | : 17/218648 | |
| DATED | : June 4, 2024 | |
| INVENTOR(S) | : Canpolat et al. | |

It is certified that error appears in the above-identified patent and that said Letters Patent is hereby corrected as shown below:

In the Claims

In Column 15, Line 10, in Claim 4, delete "the the" and insert --the-- therefor

Signed and Sealed this
Thirtieth Day of September, 2025

John A. Squires
*Director of the United States Patent and Trademark Office*